(12) United States Patent
Le

(10) Patent No.: US 12,442,124 B1
(45) Date of Patent: Oct. 14, 2025

(54) TENSIONING ADJUSTING MECHANISM FOR DRUM

(71) Applicant: Ningbo Lesli Industry Co., Ltd., Ningbo (CN)

(72) Inventor: Jianrong Le, Ningbo (CN)

(73) Assignee: Ningbo Lesli Industry Co., Ltd., Ningbo (CN)

( * ) Notice: Subject to any disclaimer, the term of this patent is extended or adjusted under 35 U.S.C. 154(b) by 0 days.

(21) Appl. No.: 18/808,131

(22) Filed: Aug. 19, 2024

(30) Foreign Application Priority Data

Jun. 19, 2024 (CN) .......................... 202421399195.7

(51) Int. Cl.
*D06F 58/08* (2006.01)
*F16H 7/08* (2006.01)
*F16H 7/14* (2006.01)

(52) U.S. Cl.
CPC .............. *D06F 58/08* (2013.01); *F16H 7/14* (2013.01); *F16H 2007/0806* (2013.01); *F16H 2007/0865* (2013.01); *F16H 2007/0891* (2013.01); *F16H 2007/0895* (2013.01)

(58) Field of Classification Search
CPC .... D06F 58/08; F16H 7/14; F16H 2007/0806; F16H 2007/0865; F16H 2007/0891; F16H 2007/0895
USPC .................................................. 474/114, 117
See application file for complete search history.

(56) References Cited

U.S. PATENT DOCUMENTS

| | | | | |
|---|---|---|---|---|
| 2,619,736 A * | 12/1952 | Geldhof | .................. | D06F 58/02 219/400 |
| 2,751,688 A * | 6/1956 | Douglas | .................. | D06F 58/02 34/601 |
| 2,758,461 A * | 8/1956 | Tann | ...................... | D06F 58/08 34/95 |
| 2,809,442 A * | 10/1957 | Glasby, Jr. | .............. | D06F 58/06 34/601 |
| 2,902,871 A * | 9/1959 | Mooar | ..................... | D06F 58/08 476/66 |
| 2,942,447 A * | 6/1960 | Rickel | ..................... | D06F 25/00 68/17 R |
| 3,072,386 A * | 1/1963 | Horecky | ................. | D06F 37/36 34/560 |

(Continued)

FOREIGN PATENT DOCUMENTS

CN 219218491 U 6/2023

*Primary Examiner* — Henry Y Liu
(74) *Attorney, Agent, or Firm* — Bayramoglu Law Offices LLC

(57) ABSTRACT

The provided is a tensioning adjusting mechanism for a drum, which includes a front plate, a rear plate, a base, a drum, a supporting seat, a motor frame, a motor, a tension spring and a synchronous belt. The base is connected between a bottom of the front plate and a bottom of the rear plate; the drum is rotatably connected between the front plate and the rear plate and located above the base; the supporting seat is disposed on the base, the motor disposed on the motor frame, and a drive shaft of the motor is connected with a synchronous belt wheel. The synchronous belt is tensioned and connected on the synchronous belt wheel and a peripheral wall of the drum. An end of the motor frame is rotatably connected on the supporting seat. An adjusting rod is connected movably between the front plate and the rear plate and located.

9 Claims, 2 Drawing Sheets

(56) References Cited

U.S. PATENT DOCUMENTS

| | | | | |
|---|---|---|---|---|
| 3,087,351 | A * | 4/1963 | Ross | D06F 37/36 34/601 |
| 3,091,974 | A * | 6/1963 | Brill | D06F 37/206 474/86 |
| 3,155,462 | A * | 11/1964 | Erickson | D06F 58/04 55/357 |
| 3,270,431 | A * | 9/1966 | Schwartz | D06F 58/08 474/70 |
| 3,283,600 | A * | 11/1966 | Buck | D06F 58/08 68/19.2 |
| 3,301,024 | A * | 1/1967 | Smith | D06F 37/36 68/19.2 |
| 3,309,783 | A * | 3/1967 | Worst | D06F 58/08 34/547 |
| 3,330,049 | A * | 7/1967 | Helton | D06F 58/08 34/118 |
| 3,365,810 | A * | 1/1968 | Kotyuk | D06F 58/08 34/380 |
| 3,402,617 | A * | 9/1968 | Fox | D06F 58/08 474/135 |
| 3,429,056 | A * | 2/1969 | Metzger | F16D 11/14 34/601 |
| 3,509,640 | A * | 5/1970 | Davis | D06F 58/08 34/601 |
| 3,513,566 | A * | 5/1970 | Baird | D06F 58/08 34/601 |
| 3,546,786 | A * | 12/1970 | Jacobs | D06F 58/08 34/560 |
| 3,707,882 | A * | 1/1973 | Burkall | F16H 7/22 474/167 |
| 3,731,550 | A * | 5/1973 | Malecki | F16H 61/662 474/83 |
| 3,864,986 | A * | 2/1975 | Bochan | D06F 58/08 474/134 |
| 3,871,241 | A * | 3/1975 | Pestka | F16C 13/006 474/135 |
| 3,890,719 | A * | 6/1975 | Braga | D06F 58/08 474/135 |
| 3,890,720 | A * | 6/1975 | Nichols | D06F 58/08 474/135 |
| 3,947,076 | A * | 3/1976 | Lindeman | F16H 7/1281 384/279 |
| 3,987,683 | A * | 10/1976 | Singh | F16H 55/36 474/167 |
| 4,019,397 | A * | 4/1977 | Bochan | F16H 7/1281 474/134 |
| 4,147,070 | A * | 4/1979 | McMillan | D06F 58/08 474/134 |
| 4,300,293 | A * | 11/1981 | Gladysz | D06F 58/08 34/108 |
| 4,407,077 | A * | 10/1983 | Smith | F16H 7/1254 474/134 |
| 4,488,363 | A * | 12/1984 | Jackson | D06F 58/08 34/572 |
| 4,653,200 | A * | 3/1987 | Werner | D06F 58/22 34/604 |
| 4,702,018 | A * | 10/1987 | Hastings | D06F 58/04 264/250 |
| 5,501,021 | A * | 3/1996 | Torborg | D06F 58/08 34/594 |
| 5,636,453 | A * | 6/1997 | Stacik | D06F 58/08 34/108 |
| 6,968,632 | B2 * | 11/2005 | Guinibert | D06F 58/04 34/527 |
| 7,204,774 | B2 * | 4/2007 | Dohogne | D06F 58/08 474/168 |
| 7,207,124 | B2 * | 4/2007 | Kim | H02K 7/1004 474/135 |
| 7,249,742 | B2 * | 7/2007 | Guinibert | D06F 39/125 248/677 |
| 7,992,321 | B2 * | 8/2011 | Ricklefs | D06F 58/08 307/141.8 |
| 8,046,933 | B2 * | 11/2011 | Yoo | D06F 58/50 68/19 |
| 8,627,580 | B2 * | 1/2014 | Kim | D06F 37/02 68/19 |
| 9,096,965 | B2 * | 8/2015 | Hong | D06F 58/08 |
| 9,316,442 | B2 * | 4/2016 | Hong | D06F 58/04 |
| 9,758,919 | B2 * | 9/2017 | Hong | D06F 58/04 |
| 9,809,917 | B2 * | 11/2017 | Hong | D06F 37/02 |
| 10,767,304 | B2 * | 9/2020 | Seo | D06F 58/36 |
| 2005/0082446 | A1 * | 4/2005 | Guinibert | D06F 39/125 248/188.3 |
| 2005/0132759 | A1 * | 6/2005 | Guinibert | D06F 58/04 68/210 |
| 2005/0255949 | A1 * | 11/2005 | Dohogne | F16H 7/24 474/174 |
| 2005/0277505 | A1 * | 12/2005 | Wong | F16H 7/08 474/140 |
| 2006/0130358 | A1 * | 6/2006 | Kim | D06F 58/08 34/494 |
| 2008/0184585 | A1 * | 8/2008 | Yoo | D06F 58/50 34/427 |
| 2009/0158616 | A1 * | 6/2009 | Ricklefs | D06F 58/06 34/601 |
| 2010/0031529 | A1 * | 2/2010 | Johnson | H02H 7/093 310/68 C |
| 2010/0132219 | A1 * | 6/2010 | Etemad | D06F 58/38 34/108 |
| 2011/0258872 | A1 * | 10/2011 | Kim | D06F 37/02 34/108 |
| 2012/0067088 | A1 * | 3/2012 | Hong | D06F 58/06 68/140 |
| 2014/0145575 | A1 * | 5/2014 | Hong | F26B 25/007 312/270.2 |
| 2014/0202217 | A1 * | 7/2014 | Hong | D06F 37/02 68/140 |
| 2014/0202218 | A1 * | 7/2014 | Hong | D06F 58/06 68/140 |
| 2019/0169784 | A1 * | 6/2019 | Seo | D06F 58/38 |
| 2023/0340713 | A1 * | 10/2023 | Kwon | D06F 58/48 |

\* cited by examiner

TENSIONING ADJUSTING MECHANISM FOR DRUM

CROSS-REFERENCE TO THE RELATED APPLICATIONS

This application is based upon and claims priority to Chinese Patent Application No. 202421399195.7, filed on Jun. 19, 2024, the entire contents of which are incorporated herein by reference.

TECHNICAL FIELD

The present invention relates the technical field of laundry dryers, and in particular to a tensioning adjusting mechanism for a drum.

BACKGROUND

In the tensioning mechanisms of the existing laundry dryers such as a tensioning mechanism and laundry treatment device entitled in the Chinese utility model patent (with publication number CN219218491U), both ends of a tension spring are fixed between a motor frame and a base, leading to inability to make tensioning adjustment; after a period of use, due to decrease of elasticity of the tension spring and tensioning force of the synchronous belt, the transmission effect of the motor output is reduced, finally leading to a lowered rotation efficiency of the drum and affecting the entire laundry drying effect.

SUMMARY

The technical problem to be solved by the present invention is that the existing tension springs are not adjustable, which affects the rotation efficiency of the drums and the entire laundry drying effect. In order to overcome the defects in the prior arts, the present invention provides an adjusting rod to increase a connection strength and make rotational adjustment so as to realize adjustment to a tensioning force of a tension spring and ensure stable transmission efficiency and transmission effect, finally achieving entire laundry drying effect.

For the purpose of the present invention, the following technical solution is employed.

There is provided a tensioning adjusting mechanism for a drum, which comprises a front plate, a rear plate, a base, a drum, a supporting seat, a motor frame, a motor, a tension spring and a synchronous belt. The base is connected between a bottom of the front plate and a bottom of the rear plate; the drum is rotatably connected between the front plate and the rear plate and located above the base; the supporting seat is disposed on the base, the motor disposed on the motor frame, and a drive shaft of the motor is connected with a synchronous belt wheel. The synchronous belt is tensioned and connected on the synchronous belt wheel and a peripheral wall of the drum such that transmission connection between the motor and the drum is realized by the synchronous belt. An end of the motor frame is rotatably connected on the supporting seat. An adjusting rod is connected movably between the front plate and the rear plate and located below the motor frame. A first locking portion for after-adjustment fixing is disposed between one end of the adjusting rod and the front plate and a second locking portion for after-adjustment fixing is disposed between the other end of the adjusting rod and the rear plate. One end of the tension spring is connected to the adjusting rod, and the other end of the tension spring is connected to the other end of the motor frame, where a pull force of the tension spring is adjusted by controlling a position of the adjusting rod. Thus, the tension spring can be tensioned between the adjusting rod and the motor frame. The adjusting rod is connected between the front plate and the rear plate to increase the connection strength, supporting and connectivity, and make rotational adjustment, so as to bring the position of the tension spring to move up and down, thereby adjusting the pull force of the tension spring, ensuring the synchronous belt is tensioned on the synchronous belt wheel and the drum, guaranteeing stable transmission efficiency and transmission effect, and finally guaranteeing the entire laundry drying effect.

Preferably, at least one screw connection hole which is disposed as transverse insertion is arranged respectively on an inner sidewall of a lower portion of the front plate and an inner sidewall of a lower portion of the rear plate; a connection vertical plate is disposed at both ends of the adjusting rod respectively; connection through holes which penetrate transversely and correspond in number to the screw connection holes are disposed on each of the connection vertical plates, and the connection through holes have a larger diameter than the screw connection holes. The first locking portion and the second locking portion are each locked and fixed by connection screws. The connection screws are inserted through the connection through holes to be connected in the screw connection holes, and the connection through holes on the adjusting rod can be rotatably adjusted relative to the connection screws. After adjustment is made to an angle, the adjusting rod is fixed between the front plate and the rear plate by tightening the connection screws. Since the diameter of the connection through holes is greater than the diameter of the screw connection holes and a screw head of the connection screws has a larger diameter than the connection through holes, it is ensured that in a case of the connection screws being not tightened, the adjusting rod can be rotatably adjusted on the connection screws, so as to realize position change and make real-time adjustment to the pull force of the tension spring. After the synchronous belt is tensioned, the connection screws are tightened to fix both ends of the adjusting rod to the front plate and the rear plate respectively. Therefore, the tensioning adjustment can be simply carried out, so as to avoid the negative impact brought by the decrease of the elasticity of the tension spring and the tensioning force of the synchronous belt after a period of use.

Preferably, a tension spring hooking plate is disposed on an outer wall of the motor frame; a first tension spring hooking hole for hooking one end of the tension spring is disposed on the tension spring hooking plate; two spaced second tension spring hooking holes are disposed in a middle portion of the adjusting rod, and a partition part of the two second tension spring hooking holes is used to hook the other end of the tension spring. With the first tension spring hooking hole on the tension spring hooking plate and the partition part, the hooks at both ends of the tension spring can be fixedly connected and thus the connectivity of the tension spring can be guaranteed.

Preferably, the motor frame comprises a frame body and a cover plate; a swing arm is connected at a side of the frame body; an end of the swing arm is rotatably connected on the supporting seat, and the cover plate is disposed on the frame body; the tension spring hooking plate is disposed on the cover plate. By the swing arm, the frame body can be entirely rotated, and the tension spring hooking plate can be easily manufactured by the cover plate, so as to perform better cooperation with the tension spring and achieve easy mounting effect.

Preferably, the drive shaft of the motor transversely penetrates through the frame body to connect with the synchronous belt wheel. When the drive shaft transversely penetrates through the frame body, the mounting stability of the motor can be guaranteed and the drive shaft can also be limited, ensuring the transmission stability and accuracy of the drive shaft.

Preferably, the supporting seat comprises a supporting bottom plate, a first ear plate and a second ear plate; the supporting bottom plate is fixedly disposed on a top surface of the base; the first ear plate and the second ear plate are disposed in a spacing on a top surface of the supporting bottom plate; a pin shaft is connected between the first ear plate and the second ear plate; a rotation through hole is disposed at an end of the swing arm, and the swing arm is sleeved on the pin shaft by the rotation through hole. By the first ear plate and the second ear plate, the pin shaft can be easily mounted. By the rotation through hole, the swing arm can be rotatably connected, increasing the rotation flexibility.

Preferably, the left and right sides of the adjusting rod are both bent upward to form respective supporting vertical plates. By the supporting vertical plates, the entire supporting and structural strength of the adjusting rod can be further improved.

Preferably, a middle part of the adjusting rod is bulged upward to form a supporting convex surface. The supporting convex surface further improves the entire supporting and structural strength of the adjusting rod.

Preferably, a plurality of reinforcing connection rods are arranged in a spacing along a circumference of the drum between the front plate and the rear plate. With the reinforcing connection rods, the connection strength and the connectivity of the front plate and the rear plate can be further improved.

In conclusion, the present invention has the following advantage: the adjusting rod is connected between the front plate and the rear plate to increase the connection strength, supporting and connectivity, and make rotational adjustment, so as to bring the position of the tension spring to move up and down, thereby adjusting the pull force of the tension spring, ensuring the synchronous belt is tensioned on the synchronous belt wheel and the drum, guaranteeing stable transmission efficiency and transmission effect, and finally guaranteeing the entire laundry drying effect.

BRIEF DESCRIPTIONS OF THE DRAWINGS

Figure 1:
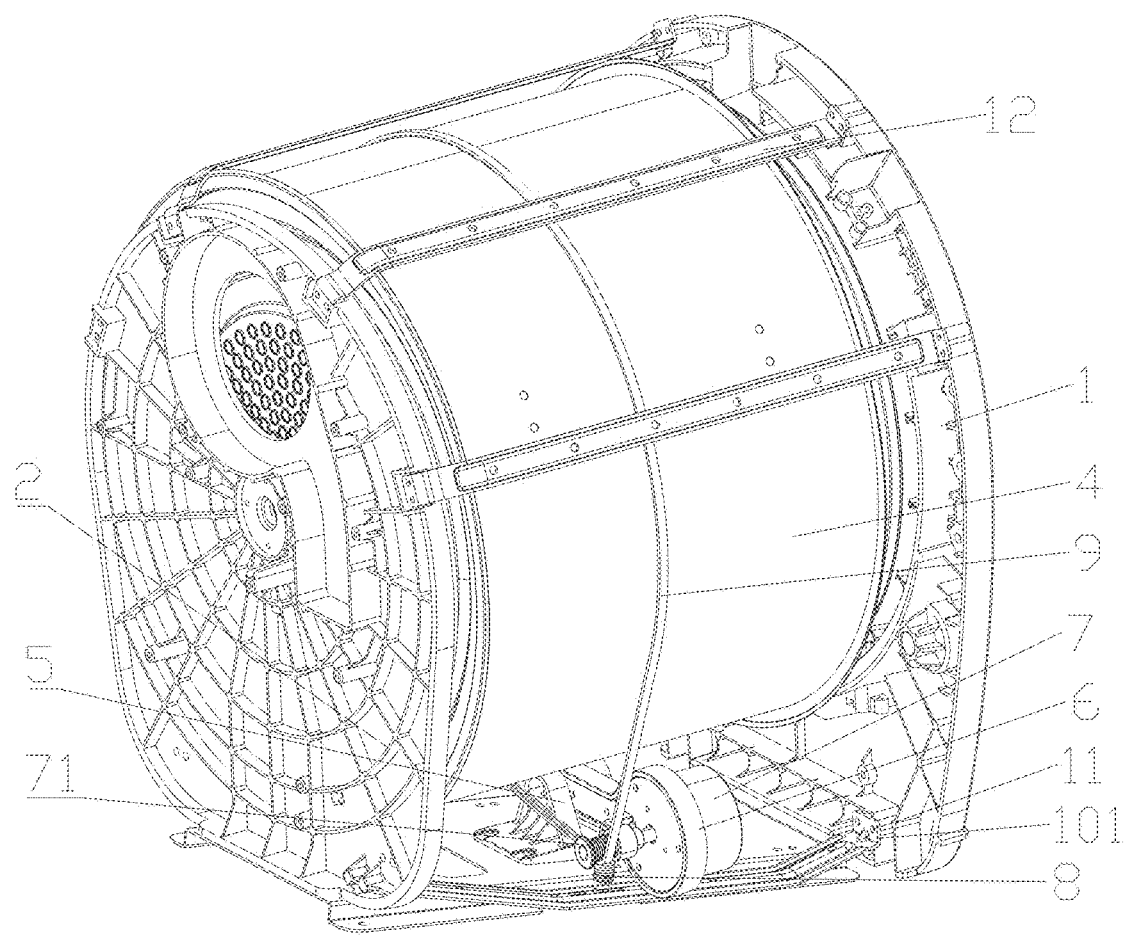
FIG. 1 is a structural schematic diagram illustrating a tensioning adjusting mechanism for a drum according to the present invention.

NUMERALS OF THE DRAWINGS ARE DESCRIBED BELOW 1. front plate, 2. rear plate, 21. screw connection hole, 3. base, 4. drum, 5. supporting seat, 51. supporting bottom plate, 52. first ear plate, 53. second ear plate, 6. motor frame, 61. tension spring hooking plate, 62. first tension spring hooking hole, 601. frame body, 602. cover plate, 603. swing arm, 7. motor, 71. synchronous belt wheel, 8. tension spring, 9. synchronous belt, 10. adjusting rod, 101. connection vertical plate, 102. second tension spring hooking hole, 103. partition part, 104. supporting vertical plate, 105. supporting convex surface, 11. connection through hole, 12. reinforcing connection rod.

DETAILED DESCRIPTIONS OF THE EMBODIMENTS

First of all, those skilled in the arts should understand that these embodiments are used only to interpret the technical principle of the embodiments of the present invention rather than to limit the scope of protection of the embodiments of the present invention. Those in the arts can make adjustment thereto based on requirements to adapt to the specific application scenarios.

In the descriptions of the embodiments of the present invention, it should be noted that, unless otherwise clearly stated or defined, the terms "connect" and "couple", and the like shall be understood in a broad sense, for example, may be fixed connection, or detachable connection, or formed into one piece; or may be mechanical connection, or electrical connection; or direct connection or indirect connection through an intermediate medium. Those skilled in the art may understand the specific meanings of the above terms in the embodiments of the present invention according to actual situations.

In the embodiments of the present invention, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly above or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

The present invention will be further detailed below in combination with drawings and specific embodiments.

As shown in FIGS. 1 to 4, there is provided a tensioning adjusting mechanism for a drum, which comprises a front plate 1, a rear plate 2, a base 3, a drum 4, a supporting seat 5, a motor frame 6, a motor 7, a tension spring 8 and a synchronous belt 9. The base 3 is connected between a bottom of the front plate 1 and a bottom of the rear plate 2; the drum 4 is rotatably connected between the front plate 1 and the rear plate 2 and located above the base 3; a plurality of reinforcing connection rods 12 are arranged in a spacing along a circumference of the drum 4 between the front plate 1 and the rear plate 2. With the reinforcing connection rods 12, the connection strength and the connectivity of the front plate 1 and the rear plate 2 can be further improved. The supporting seat 5 is disposed on the base 3, the motor 7 disposed on the motor frame, and a drive shaft of the motor 7 is connected with a synchronous belt wheel 71. The synchronous belt 9 is tensioned and connected on the synchronous belt wheel 71 and a peripheral wall of the drum 4 such that transmission connection between the motor 7 and the drum 4 is realized by the synchronous belt 9. A left end of the motor frame 6 is rotatably connected on the supporting seat 5 and a right end of the motor frame 6 is supported by the synchronous belt 9. An adjusting rod 10 is connected movably between a lower portion of the front plate 1 and a lower portion of the rear plate 2 and located below the motor frame 6. A first locking portion for after-adjustment fixing is disposed between one end of the adjusting rod 10 and the front plate 1 and a second locking portion for after-adjustment fixing is disposed between the other end of the adjusting rod 10 and the rear plate 2. One end of the tension spring 8 is connected to the adjusting rod 10, and the other end of the tension spring 8 is connected to a right portion of the motor frame 6, where a pull force of the tension spring 8 is adjusted by controlling a position of the adjusting rod 10. Thus, the tension spring 8 can be tensioned between the adjusting rod 10 and the motor frame 6. The adjusting rod 10 is connected between the front plate 1 and the rear plate 2 to increase the connection strength, supporting and connectivity, and make rotational adjustment, so as to bring the position of the tension spring 8 to move up and down, thereby adjusting the pull force of the tension spring 8, ensuring the synchronous belt 9 is tensioned on the synchronous belt wheel 71 and the drum 4, guaranteeing stable transmission efficiency and transmission effect, and finally guaranteeing the entire laundry drying effect.

Figure 2:
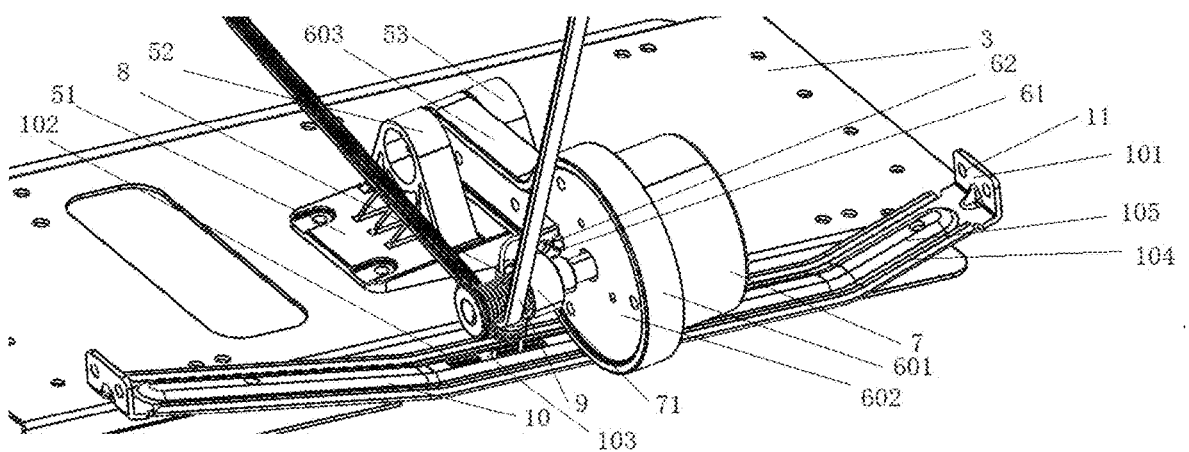
FIG. 2 is a partial structural schematic diagram illustrating a tensioning adjusting mechanism for a drum according to the present invention.
Figure 3:
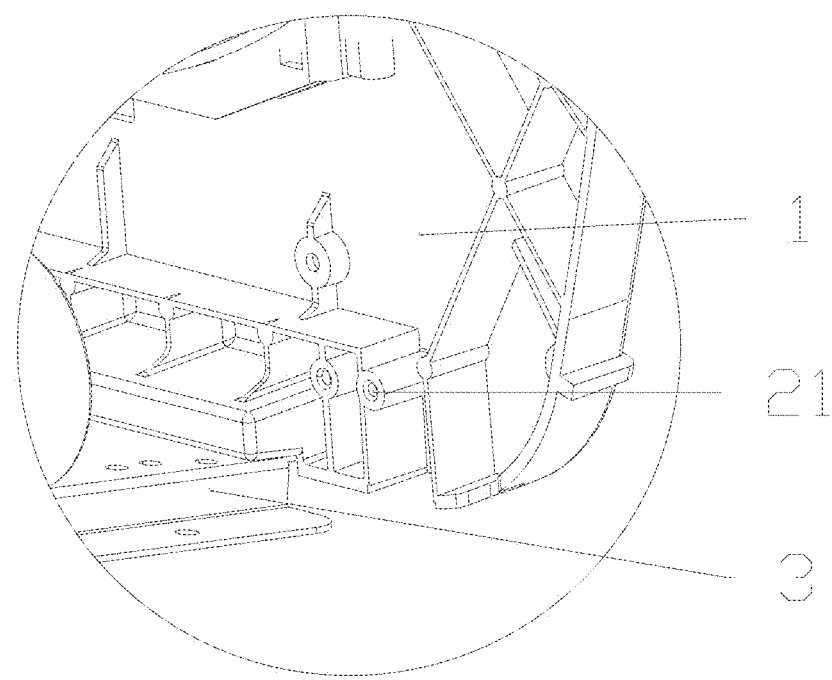
FIG. 3 is a structural schematic diagram illustrating a connection of a front plate according to the present invention.
Figure 4:
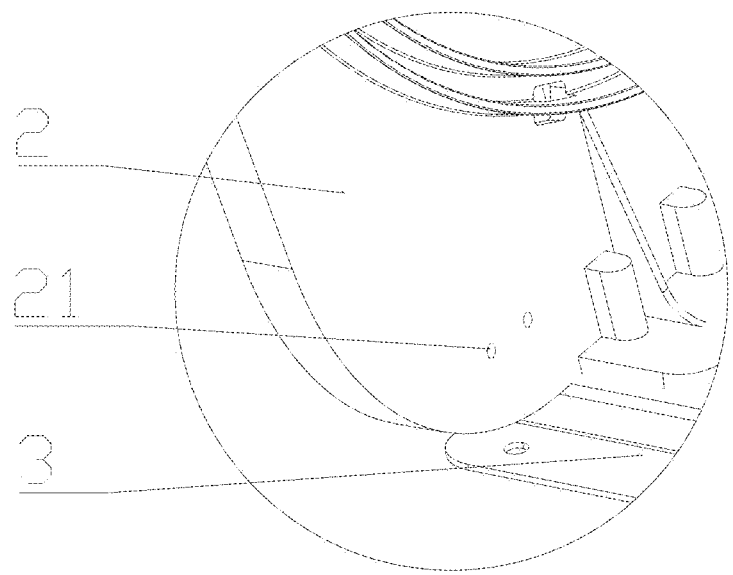
FIG. 4 is a structural schematic diagram illustrating a connection of a rear plate according to the present invention.

As shown in FIGS. 2 to 4, two screw connection holes 21 which are distributed side by side and disposed as transverse insertion are arranged respectively on an inner sidewall of the lower portion of the front plate 1 and an inner sidewall of the lower portion of the rear plate 2; a connection vertical plate 101 is disposed at both ends of the adjusting rod 10 respectively; connection through holes 11 which penetrate transversely and correspond in number to the screw connection holes 21 are disposed on each of the connection vertical plates 101, and the connection through holes 11 have a larger diameter than the screw connection holes 21. The first locking portion and the second locking portion are each locked and fixed by connection screws. The connection screws are inserted through the connection through holes 11 to be connected in the screw connection holes 21, and the connection through holes 11 on the adjusting rod 10 can be rotatably adjusted relative to the connection screws. After adjustment is made to an angle, the adjusting rod 10 is fixed between the front plate 1 and the rear plate 2 by tightening the connection screws. Since the diameter of the connection through holes 11 is greater than the diameter of the screw connection holes 21 and a screw head of the connection screws has a larger diameter than the connection through holes 11, it is ensured that in a case of the connection screws being not tightened, the adjusting rod 10 can be rotatably adjusted on the connection screws, so as to realize position change and make real-time adjustment to the pull force of the tension spring 8. After the synchronous belt 9 is tensioned, the connection screws are tightened to fix both ends of the adjusting rod 10 to the front plate 1 and the rear plate 2 respectively. Therefore, the tensioning adjustment can be simply carried out, so as to avoid the negative impact brought by the decrease of the elasticity of the tension spring 8 and the tensioning force of the synchronous belt 9 after a period of use.

As shown in FIG. 2, a tension spring hooking plate 61 is disposed on an outer wall of the motor frame 6; a first tension spring hooking hole 62 for hooking one end of the tension spring 8 is disposed on the tension spring hooking plate 61; two spaced second tension spring hooking holes 102 are disposed in a middle portion of the adjusting rod 10, and a partition part 103 of the two second tension spring hooking holes 102 is used to hook the other end of the tension spring 8. With the first tension spring hooking hole 62 on the tension spring hooking plate 61 and the partition part 103, the hooks at both ends of the tension spring 8 can be fixedly connected and thus the connectivity of the tension spring 8 can be guaranteed.

As shown in FIG. 2, the motor frame 6 comprises a frame body 601 and a cover plate 602; a swing arm 603 is connected at a side of the frame body 601; an end of the swing arm 603 is rotatably connected on the supporting seat 5, and the cover plate 602 is disposed on the frame body 601; the tension spring hooking plate 61 is disposed on the cover plate 602. By the swing arm 603, the frame body 601 can be entirely rotated, and the tension spring hooking plate 61 can be easily manufactured by the cover plate 602, so as to perform better cooperation with the tension spring 8 and achieve easy mounting effect. The drive shaft of the motor 7 transversely penetrates through the frame body 601 to connect with the synchronous belt wheel 71. When the drive shaft transversely penetrates through the frame body 601, the mounting stability of the motor 7 can be guaranteed and the drive shaft can also be limited, ensuring the transmission stability and accuracy of the drive shaft.

As shown in FIG. 2, the supporting seat 5 comprises a supporting bottom plate 51, a first ear plate 52 and a second ear plate 53; the supporting bottom plate 51 is fixedly disposed on a top surface of the base 3; the first ear plate 52 and the second ear plate 53 are disposed in a spacing on a top surface of the supporting bottom plate 51; a pin shaft is connected between the first ear plate 52 and the second ear plate 53; a rotation through hole is disposed at an end of the swing arm 603, and the swing arm 603 is sleeved on the pin shaft through the rotation through hole. By the first ear plate 52 and the second ear plate 53, the pin shaft can be easily mounted. By the rotation through hole, the swing arm 603 can be rotatably connected, increasing the rotation flexibility.

As shown in FIG. 2, the left and right sides of the adjusting rod 10 are both bent upward to form respective supporting vertical plates 104. By the supporting vertical plates 104, the entire supporting and structural strength of the adjusting rod 10 can be further improved. A middle part of the adjusting rod 10 is bulged upward to form a supporting convex surface 105. The supporting convex surface 105 further improves the entire supporting and structural strength of the adjusting rod 10.

In the descriptions of the embodiments of the present invention, it is noted that in the descriptions of the present invention, the terms "inner", "outer" and the like for indicating the directional or positional relationship are based on the directional or positional relationship shown in the drawings and the terms are used only to help the descriptions rather than to indicate or imply the device or component must have a specific orientation or be constructed or operated in a specific orientation and thus shall not be understood as limiting of the present invention.

In the descriptions of the present invention, the descriptions by referring to the terms "one embodiment", "some embodiments" "in this embodiment", "specific example" or "some examples" or the like mean that the specific features, mechanisms, materials or characteristics described in combination with this embodiment or example are incorporated in at least one embodiment or example of the present invention. In this specification, the illustrative expressions of the above terms are not necessarily directed to same embodiment or example. Furthermore, the described specific features, mechanisms, materials or characteristics may be combined in an appropriate way in one or more embodiments or examples. Moreover, in a case of no conflicts, those skilled in the arts may perform combination for different embodiments or examples and the features of different embodiments or examples in the specification.

The above descriptions are only the specific embodiments of the present invention but the scope of protection of the present invention is not limited hereto. All changes or substitutions those skilled in the arts can easily conceive of within the technical scope of the present invention shall fall within the scope of protection of the present invention. Therefore, the scope of protection of the present invention shall be indicated by the claims.

The invention claimed is:

1. A tensioning adjusting mechanism for a drum, comprising a front plate, a rear plate, a base, a drum, a supporting seat, a motor frame, a motor, a tension spring and a synchronous belt;
    wherein the base is connected between a bottom of the front plate and a bottom of the rear plate;
    the drum is rotatably connected between the front plate and the rear plate and located above the base;
    the supporting seat is disposed on the base, the motor is disposed on the motor frame, and a drive shaft of the motor is connected with a synchronous belt wheel;
    the synchronous belt is tensioned and connected on the synchronous belt wheel and a peripheral wall of the drum and a transmission connection between the motor and the drum is realized by the synchronous belt;
    a first end of the motor frame is rotatably connected on the supporting seat;
    an adjusting rod is connected movably between the front plate and the rear plate and located below the motor frame;
    a first locking portion for after-adjustment fixing is disposed between a first end of the adjusting rod and the front plate, and a second locking portion for after-adjustment fixing is disposed between a second end of the adjusting rod and the rear plate; and
    a first end of the tension spring is connected to the adjusting rod, and a second end of the tension spring is connected to a second end of the motor frame, and a pull force of the tension spring is adjusted by controlling a position of the adjusting rod to make the tension spring be tensioned between the adjusting rod and the motor frame.

2. The tensioning adjusting mechanism for the drum according to claim 1, wherein at least one screw connection hole is arranged respectively on an inner sidewall of a lower portion of the front plate and an inner sidewall of a lower portion of the rear plate, wherein the at least one screw connection hole is disposed as transverse insertion;
    a connection vertical plate is disposed at both ends of the adjusting rod, respectively;
    connection through holes are disposed on each of the connection vertical plates, and the connection through holes have a larger diameter than the screw connection holes, wherein the connection through holes penetrate transversely and correspond in number to the screw connection holes;
    the first locking portion and the second locking portion are each locked and fixed by connection screws;
    the connection screws are inserted through the connection through holes to be connected in the screw connection holes, and the connection through holes on the adjusting rod can be rotatably adjusted relative to the connection screws; and
    after adjustment is made to an angle, the adjusting rod is fixed between the front plate and the rear plate by tightening the connection screws.

3. The tensioning adjusting mechanism for the drum according to claim 1, wherein a tension spring hooking plate is disposed on an outer wall of the motor frame; a first tension spring hooking hole for hooking the second end of the tension spring is disposed on the tension spring hooking plate; and two spaced second tension spring hooking holes are disposed in a middle portion of the adjusting rod, and a partition part of the two spaced second tension spring hooking holes is configured to hook the first end of the tension spring.

4. The tensioning adjusting mechanism for the drum according to claim 3, wherein the motor frame comprises a frame body and a cover plate; a swing arm is connected at a side of the frame body; an end of the swing arm is rotatably connected on the supporting seat, and the cover plate is disposed on the frame body; and the tension spring hooking plate is disposed on the cover plate.

5. The tensioning adjusting mechanism for the drum according to claim 4, wherein the drive shaft of the motor transversely penetrates through the frame body to connect with the synchronous belt wheel.

6. The tensioning adjusting mechanism for the drum according to claim 4, wherein the supporting seat comprises a supporting bottom plate, a first ear plate and a second ear plate;
    the supporting bottom plate is fixedly disposed on a top surface of the base;
    the first ear plate and the second ear plate are disposed in a spacing on a top surface of the supporting bottom plate;
    a pin shaft is connected between the first ear plate and the second ear plate; and
    a rotation through hole is disposed at the end of the swing arm, and the swing arm is sleeved on the pin shaft by the rotation through hole.

7. The tensioning adjusting mechanism for the drum according to claim 1, wherein left and right sides of the adjusting rod are both bent upward to form respective supporting vertical plates.

8. The tensioning adjusting mechanism for the drum according to claim 1, wherein a middle part of the adjusting rod is bulged upward to form a supporting convex surface.

9. The tensioning adjusting mechanism for the drum according to claim 1, wherein a plurality of reinforcing connection rods are arranged in a spacing along a circumference of the drum between the front plate and the rear plate.

* * * * *